Jan. 1, 1946.　　　　　L. McHARG　　　　　2,392,096
LOAD CAPACITY TESTING DEVICE
Filed Oct. 23, 1944
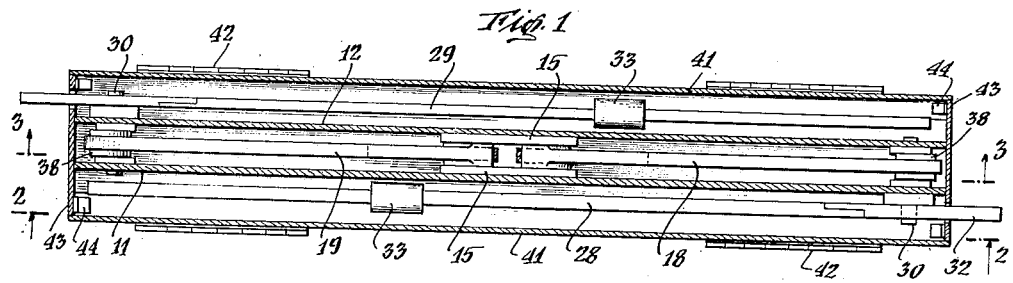
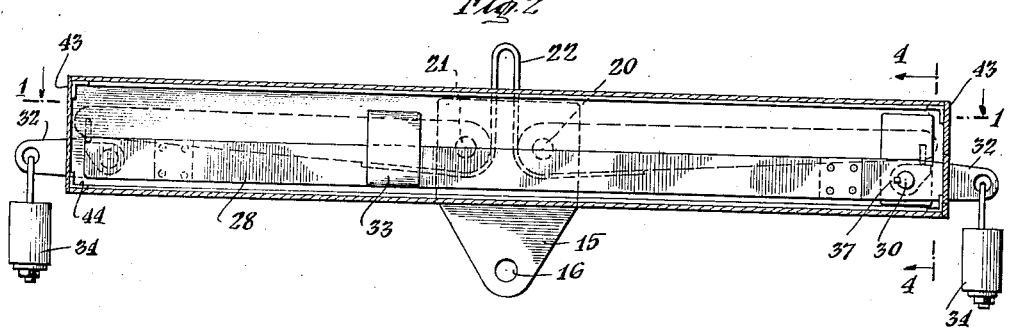
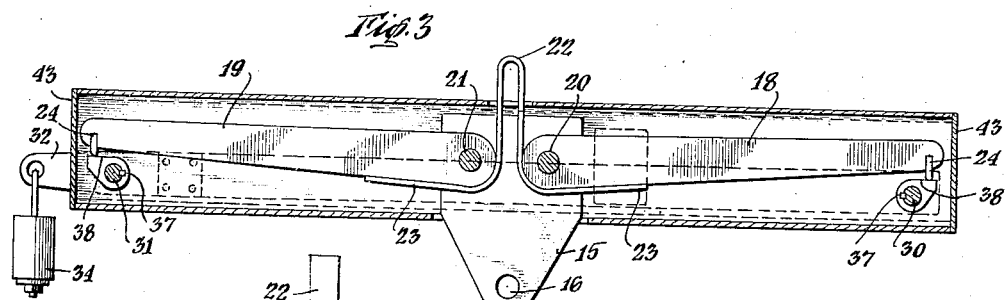
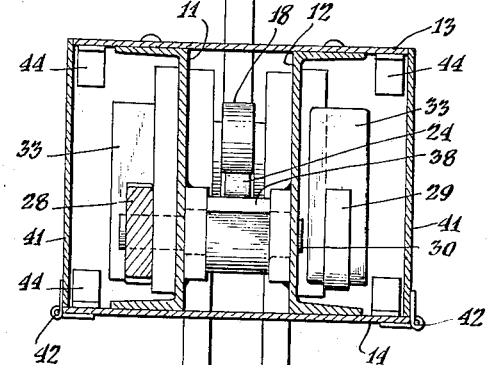
INVENTOR.
Leslie McHarg
BY
Bohleber, Fassett & Montstream
ATTORNEYS Patented Jan. 1, 1946

2,392,096

UNITED STATES PATENT OFFICE 2,392,096

LOAD CAPACITY TESTING DEVICE

Leslie McHarg, Huntington, N. Y.

Application October 23, 1944, Serial No. 559,902

6 Claims. (Cl. 73—141)

The invention relates to a load capacity testing device or scale for determining whether or not a structure comes within the maximum capacity of the load which the structure is intended to carry or withstand. The testing device is particularly applicable to testing the strength of booms such as are found on ships, derricks, shovels and the like. The testing device is attached to the structure the strength of which is to be tested and also anchored to a fixed structure whereupon a load is applied to the structure which is in excess of the load which the structure is intended to carry. In testing the boom, the device is attached to the lifting cables or block operating from the boom. The load applied is measured or balanced by the testing device so that the device is a load measuring scale.

It is an object of the invention to construct a new and novel load testing device.

Another object is to construct a load testing device for very heavy loads which is effective and also simple in its construction and inexpensive to build.

Another object is to construct a load testing device which divides the load so that each scale element measures or balances a portion only of the full load applied.

Another object is to construct a load testing device using pairs of lever arms in which one arm of the pair largely counter-balances the weight of the other arm of the pair.

A still further object is to construct a load testing device having a new and novel frame.

Other objects of the invention will be more apparent from the following description taken in connection with the accompanying drawing which illustrates a preferred embodiment thereof in which:

Figure 1 is a top elevation of the testing device in section.

Figure 2 is a longitudinal section through the testing device taken on line 2—2 of Figure 1.

Figure 3 is a longitudinal section through the testing device taken on line 3—3 of Figure 1.

Figure 4 is a cross section through the device taken on line 4—4 of Figure 2.

The testing device utilizes a plurality of balancing means connected together with a load applying connection in order to divide the load. In the construction particularly illustrated a pair of balancing means is shown which divides the load in half. It is clear that additional balancing means would further divide the load applied to the testing device.

The testing device includes a frame capable of withstanding the heavy force or load applied thereto when testing a structure. The frame may be of any suitable construction, however that illustrated is simple and effective and includes a pair of channel irons or beams 11 and 12 which are secured in spaced relation in any suitable fashion such as by a top plate 13 and a bottom plate 14 secured to the flange of the channel irons at the top and bottom respectively of the frame such as by bolts. The frame also carries anchoring means which is shown as formed by brackets 15 secured as by welding to each channel iron and projecting through the bottom plate and below the frame. The brackets have a hole 16 to receive a pin which is adapted to receive a shackle or other structure for anchoring the frame to some fixed structure. For testing the boom of a ship the frame of the testing device may be anchored to any part of the ship's structure.

A pair of balancing means is shown which includes a first pair of arms 18 and 19 extending in opposite directions from the center of the frame and are pivotally supported at their adjacent ends upon the frame. Preferably a pivot 20 and 21 is provided for the respective arms and the arms are mounted upon self-centering roller bearings. The pivots 20 and 21 are mounted upon the frame or channel irons and the brackets 15 may extend along the face or web of the channel and also serve as reinforcing plates for the pivots. Means are utilized to connect the load with each balancing means so that the load is divided. Each of the arms at their adjacent ends have means for anchoring the same to the cable or hook of the boom or structure to be tested. Any suitable connection may be used, however, the simple structure illustrated is preferred. This includes a metal strap 22 bent in the form of an inverted U and having each end or leg 23 bent around the end of an arm and secured thereto, such as by welding. The upper U portion projects through the top plate 13 of the frame and is adapted to receive a hook or other means carried by the boom to be tested. The outer end of each arm carried a load transfer means 24 which may be a ball or a knife edge.

A second pair of arms including an arm 28 and an arm 29 is carried by the frame in any desired location thereon. In the illustrated construction, one arm is located between the flanges of each channel iron on the opposite side of the web from the first arms 18 and 19. Each arm 28 and 29 is carried upon a pivot shaft 30 and 31 respectively each mounted in suitable bearings at the end of the frame. Each of the arms 28 and 29 extends the full length or substantially the full length of the frame or the combined length of the first pair of arms. Each of the second pair of arms may have a counter-weight 34 for counter-balancing the weight of the arm which counter-weight may be carried on an extension 32 which projects beyond the end of the frame. A balancing weight 33 is slidably mounted upon each of the arms 28 and 29. The arms 28 and 29 may be entirely, or partially of aluminum as illustrated, in order to lighten the weight of the arm and hence lighten the counter-weight.

A connection is made between the outer end of each first arm 18 and 19 or the load transferring means 24 thereof and its respective second arm, that illustrated including the respective pivot shaft 30 or 31 pivotally mounted in the frame and fastened such as by the key 37 to its respective arm 28 or 29. The pivot shaft carries an extension or platform 38 which is engaged, at a point removed about one inch, for example, from the axis of the shaft, by the load transfer means 24 carried upon the end of each arm 18 and 19. There is therefore a substantial increase in the lever ratio between the two arms. The load transfer means 24 engages the platform upon the opposite side of the pivot axis from which its respective second arm 28 or 29 extends. With this arrangement the second arm is counter-balanced largely by the weight of the first arm so that a minimum weight 33 is needed to counter-balance the system of levers.

Each system of levers disclosed provides a maximum leverage ratio of approximately 1000 to 1 and with the load applied being divided between the pair of leverages or balancing means, the slidable weights 33 will balance a load applied to the load applying means or strap 22 of as large as 55,000 pounds. It is clear that the testing device may have a range greater or less than that used as an example merely by proper proportioning of parts. In the preferred construction each balancing means includes a pair of levers namely the first arm 18 and its second arm 28, and the first arm 19 and its second arm 29. This system of pairs of levers is needed for heavy loads in order to obtain a high leverage ratio. If a high ratio is not needed a plurality or a pair of balancing means may be used comprising single levers alone with the load being divided between each balancing means.

A closing plate 41 may be carried upon each side of the frame upon hinges 42 in order to enclose each side face of the frame and enclose the second arms of the testing device. End plates 43 may also be secured to the ends of the frame by brackets 44 in order to completely enclose the mechanism.

The dividing of the load applied to the testing device not only reduces the force which each set of levers is to balance but also balances the weight of the device so that it remains horizontal or in substantially horizontal position when in use. Since the frame and the parts are necessarily heavy, it is much easier to handle if it balances horizontally when the boom lines are pulled and the load begins to be applied to the tester. Usually the balancing weights are fixed upon the bar by a set screw at a position representing a twenty-five percent overload on the boom and the load is increased until the two arms lift to show that the full overload stress is carried by the boom.

The invention is presented to fill a need for improvements in a load capacity testing device. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A testing device for testing the strength of structures such as booms comprising a frame, means carried by the frame to anchor the same to some other structure, a pair of arms with the adjacent end of each arm being pivotally mounted upon the frame and the remote end being free, means connected to the adjacent end of each arm to apply a load simultaneously thereto, a second pair of arms extending substantially the combined length of both arms of the first pair of arms, one arm of the second pair being pivotally mounted on the frame adjacent the free end of one arm of the first pair and the other arm of the second pair being pivotally mounted on the frame adjacent the free end of the other arm of the first pair, and means connecting the free end of each arm of the first pair to its respective arm of the second pair and adjacent its pivot to transfer the force thereof to the second arm.

2. A testing device for testing the strength of structures such as booms comprising a frame, means carried by the frame to anchor the same to other structure, a pair of arms with the adjacent end of each arm being pivotally mounted to the frame and the remote end being free, means connected to the adjacent end of each arm to apply a load simultaneously thereto, a second pair of arms extending substantially the combined length of both arms of the first pair of arms, one arm of the second pair being pivotally mounted on the frame adjacent the free end of one arm of the first pair and the other arm of the second pair being pivotally mounted on the frame adjacent the free end of the other arm of the first pair, means connecting the free end of each arm of the first pair to its respective arm of the second pair to transfer the force thereof to the second arm, and a balancing weight movable along each arm of the second pair of arms.

3. A testing device for testing the strength of structures such as booms comprising a frame, means carried by the frame to anchor the same to some other structure, a pair of arms with the adjacent end of each arm being pivotally mounted to the frame and the remote end being free, a U shaped strap having one end connected to the adjacent end of one arm aforesaid and the other end connected to the adjacent end of the other arm to apply a load simultaneously thereto, a second pair of arms extending substantially the combined length of both arms of the first pair of arms, one arm of the second pair being pivotally mounted on the frame adjacent the free end of one arm of the first pair and the other arm of the second pair being pivotally mounted on the frame adjacent the free end of the other arm of the first pair, means connecting the free end of each arm of the first pair of to its respective arm of the second pair to transfer the force thereof to the second arm, and a balancing weight movable along each arm of the second pair.

4. A device for testing the strength of structures such as booms comprising a frame formed from a pair of channel irons secured together in spaced relation with their flanges extending outwardly, means carried by the frame to anchor the same to some other structure, a pair of arms extending away from each other and positioned between the channel irons, the adjacent end of each arm being pivotally mounted upon the frame and the remote end being free, means connected to the adjacent end of each arm to apply a load thereto, a second pair of arms each arm extending substantially the combined length of both arms of the first pair of arms, one arm of the second pair being pivotally mounted on each channel iron of the frame between the flanges thereof and adjacent the free end of each arm of the first pair, means connecting the free end of each arm of the first pair to its respective arm of the second pair to transfer the force thereof to the second arm, and a balancing weight movable along each arm of the second pair.

5. A device for testing the strength of structures such as booms comprising a frame, means carried by the frame to anchor the same to some other structure, a pair of arms extending away from each other and the adjacent end of each arm being pivotally mounted upon the frame and the remote end being free, means connected to the adjacent end of each arm to apply a load thereto, a second pair of arms each arm extending substantially the combined length of both arms of the first pair of arms, a pivot mounted in the frame adjacent the free end of each arm of the first pair and secured to its respective arm of the second pair, a platform carried by the pivot, means carried by the free end of each arm of the first pair and engaging its respective pivot platform to transfer the force thereof to the second arm, and a balancing weight movable along each arm of the second pair.

6. A device for testing the strength of structures such as booms comprising a frame, means carried by the frame to anchor the same to some other structure, a pair of arms extending away from each other and the adjacent end of each arm being pivotally mounted upon the frame and the remote end being free, means connected to the adjacent end of each arm to apply a load thereto, a second pair of arms each arm extending substantially the combined length of both arms of the first pair of arms, a pivot mounted in the frame adjacent the free end of each arm of the first pair and secured to its respective arm of the second pair of arms, a platform carried by the pivot projecting in a direction opposite from the direction in which the second arm projects, means carried by the free end of each arm of the first pair engaging its respective pivot platform to transfer the force thereof to the second arm, and a balancing weight movable along each arm of the second pair.

LESLIE McHARG.